United States Patent
Cohen

(10) Patent No.: US 9,022,059 B2
(45) Date of Patent: May 5, 2015

(54) FLOW REGULATOR FOR AGRICULTURAL DRIP EMITTER

(75) Inventor: Amir Cohen, Doar-Na Misgav (IL)

(73) Assignee: Amirim Products Development & Patents Ltd., Yuvalim (IL)

( * ) Notice: Subject to any disclaimer, the term of this patent is extended or adjusted under 35 U.S.C. 154(b) by 780 days.

(21) Appl. No.: 13/280,476

(22) Filed: Oct. 25, 2011

(65) Prior Publication Data

US 2012/0097254 A1    Apr. 26, 2012

(30) Foreign Application Priority Data

Oct. 25, 2010  (GB) .................................. 1017985.1

(51) Int. Cl.
| F15D 1/00 | (2006.01) |
| A01G 25/02 | (2006.01) |
| F16K 17/28 | (2006.01) |
| B05B 15/02 | (2006.01) |

(52) U.S. Cl.
CPC ............. *A01G 25/02* (2013.01); *F16K 17/28* (2013.01); *A01G 25/023* (2013.01); *B05B 15/0216* (2013.01)

(58) Field of Classification Search
CPC ...... F16K 17/28; A01G 25/02; A01G 25/023; B05B 15/0216
USPC ............... 137/503, 516.27, 517, 516.25, 859, 137/315.05, 501, 601.18; 138/43; 239/542
See application file for complete search history.

(56) References Cited

U.S. PATENT DOCUMENTS

| 780,334 | A | | 1/1905 | Freeman |
| 3,348,694 | A | | 10/1967 | Smith |
| 3,523,559 | A | * | 8/1970 | Gibson ............................ 138/46 |
| 3,779,388 | A | | 12/1973 | Coughlin |
| 3,918,646 | A | | 11/1975 | Leal-Diaz et al. |
| 3,970,251 | A | | 7/1976 | Harmony |
| RE29,022 | E | | 11/1976 | Spencer |
| 4,032,072 | A | | 6/1977 | McElhoe et al. |
| 4,059,228 | A | * | 11/1977 | Werner .......................... 239/106 |
| 4,079,750 | A | * | 3/1978 | Ludwig ....................... 137/513.7 |
| 4,196,753 | A | * | 4/1980 | Hammarstedt ................. 138/43 |

(Continued)

FOREIGN PATENT DOCUMENTS

| BE | 895982 | 8/1983 |
| EP | 1884157 | 2/2008 |
| WO | WO 2012/056448 | 5/2012 |

OTHER PUBLICATIONS

European Search Report and the European Search Opinion Dated Feb. 23, 2012 From the European Patent Office Re. Application No. 11186539.0.

(Continued)

*Primary Examiner* — Craig Schneider
*Assistant Examiner* — Nicole Wentlandt

(57) ABSTRACT

An apparatus is supplied for a self adjusting regulator suited for an irrigation emitter. A curved flow channel is integrated into a concave dome shaped surface. A deformable member deforms to approach the surface to adjust the resistance to flow. The concave dome shaped surface may match a deformed shape of the membrane. Irregularities in the interface between the surface and the deformable member are configured to achieve a desired discharge under varying flow conditions. The deformable member may activate an inlet filter cleaner by pushing a ram and thereby unclogging the filter.

15 Claims, 4 Drawing Sheets

(56) References Cited

U.S. PATENT DOCUMENTS

| | | | | |
|---|---|---|---|---|
| 4,209,133 | A | 6/1980 | Mehoudar | |
| 4,331,293 | A | 5/1982 | Rangel-Garza | |
| 4,344,576 | A | 8/1982 | Smith | |
| 4,428,397 | A * | 1/1984 | Bron | 137/504 |
| 4,502,631 | A * | 3/1985 | Christen | 239/106 |
| 4,527,595 | A * | 7/1985 | Jorgensen et al. | 138/43 |
| 4,623,094 | A | 11/1986 | Smeyers | |
| 4,682,730 | A * | 7/1987 | Smeyers | 239/109 |
| 4,718,608 | A * | 1/1988 | Mehoudar | 239/542 |
| 4,806,258 | A | 2/1989 | Duncan | |
| 5,183,208 | A * | 2/1993 | Cohen | 239/542 |
| 5,279,462 | A | 1/1994 | Mehoudar | |
| 5,400,973 | A | 3/1995 | Cohen | |
| 5,413,282 | A * | 5/1995 | Boswell | 239/542 |
| 5,609,303 | A * | 3/1997 | Cohen | 239/542 |
| 5,615,838 | A | 4/1997 | Eckstein et al. | |
| 5,634,594 | A | 6/1997 | Cohen | |
| 5,820,029 | A * | 10/1998 | Marans | 239/542 |
| 6,250,571 | B1 * | 6/2001 | Cohen | 239/542 |
| 6,276,491 | B1 * | 8/2001 | Schonfeld | 184/7.3 |
| 6,302,338 | B1 * | 10/2001 | Cohen | 239/542 |
| 8,291,936 | B2 * | 10/2012 | Carmody et al. | 137/843 |
| 2002/0047053 | A1 * | 4/2002 | Bron | 239/542 |
| 2002/0070297 | A1 | 6/2002 | Bolinis et al. | |
| 2005/0121401 | A1 | 6/2005 | Walton et al. | |
| 2009/0029434 | A1 | 1/2009 | Tsai et al. | |
| 2010/0163651 | A1 | 7/2010 | Feith et al. | |
| 2011/0186652 | A1 | 8/2011 | Cohen | |
| 2012/0097196 | A1 | 4/2012 | Cohen | |
| 2013/0213905 | A1 | 8/2013 | Cohen | |

OTHER PUBLICATIONS

International Preliminary Report on Patentability Dated May 10, 2013 From the International Bureau of WIPO Re. Application No. PCT/IL2011/000824.

International Search Report and the Written Opinion Dated May 23, 2012 From the International Searching Authority Re. Application No. PCT/IL2011/000824.

Restriction Official Action Dated Jun. 24, 2013 From the US Patent and Trademark Office Re. U.S. Appl. No. 13/881,401.

Official Action Dated Jun. 24, 2014 From the US Patent and Trademark Office Re. U.S. Appl. No. 13/881,401.

Office Action Dated May 12, 2014 From the Israel Patent Office Re. Application No. 215931 and Its Translation Into English.

Office Action Dated Jun. 26, 2013 From the Israel Patent Office Re. Application No. 215931 and Its Translation Into English.

Official Action Dated Aug. 6, 2013 From the US Patent and Trademark Office Re. U.S. Appl. No. 13/881,401.

Patents Act 1977: Patents Rules 2007 Report Under Section 15A Dated Oct. 28, 2010 From the Intellectual Property Office of the United Kingdom Re. Application No. GB1017985.1.

Patents Act 1977: Search Report Under Section 17(5) Dated Feb. 11, 2011 From the Intellectual Property Office of the United Kingdom Re. Application No. GB1017985.1.

Official Action Dated Nov. 21, 2013 From the US Patent and Trademark Office Re. U.S. Appl. No. 13/881,401.

Applicant-Initiated Interview Summary Dated Oct. 31, 2013 From the US Patent and Trademark Office Re. U.S. Appl. No. 13/881,401.

Communication Under Rule 71(3) EPC Dated Jul. 23, 2013 From the European Patent Office Re. Application No. 11186539.0.

Communication Pursuant to Article 94(3) EPC Dated Jul. 11, 2014 From the European Patent Office Re. Application No. 11794244.1.

Communication Pursuant to Article 94(3) EPC Dated Nov. 30, 2012 From the European Patent Office Re. Application No. 11186539.0.

Advisory Action Before the Filing of An Appeal Brief Dated Mar. 4, 2014 From the US Patent and Trademark Office Re. U.S. Appl. No. 13/881,401.

Communication Pursuant to Article 94(3) EPC Dated Feb. 12, 2014 From the European Patent Office Re. Application No. 11794244.1.

Communication Pursuant to Rules 70(2) and 70a(2) EPC and Reference to Rule 39(1) EPC Dated May 2, 2012 From the European Patent Office Re. Application No. 11186539.0.

Restriction Official Action Dated Jan. 22, 2015 From the US Patent and Trademark Office Re. U.S. Appl. No. 13/280,472.

Office Action Dated Jan. 20, 2015 From the Israel Patent Office Re. Application No. 215931.

Patents Act 1977: Examination Report Under Section 18(3) Dated Jan. 16, 2015 From the Intellectual Property Office of the United Kingdom Re. Application No. GB1017985.1.

Translation Dated Feb. 9, 2015 of Office Action Dated Jan. 20, 2015 From the Israel Patent Office Re. Application No. 215931.

* cited by examiner

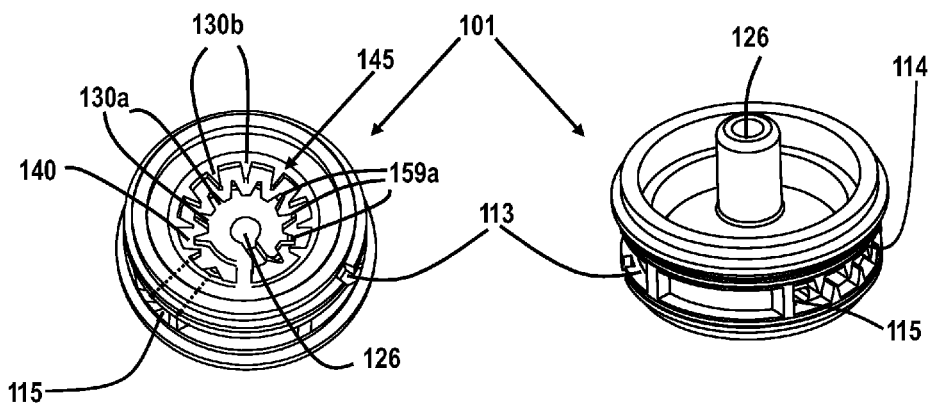
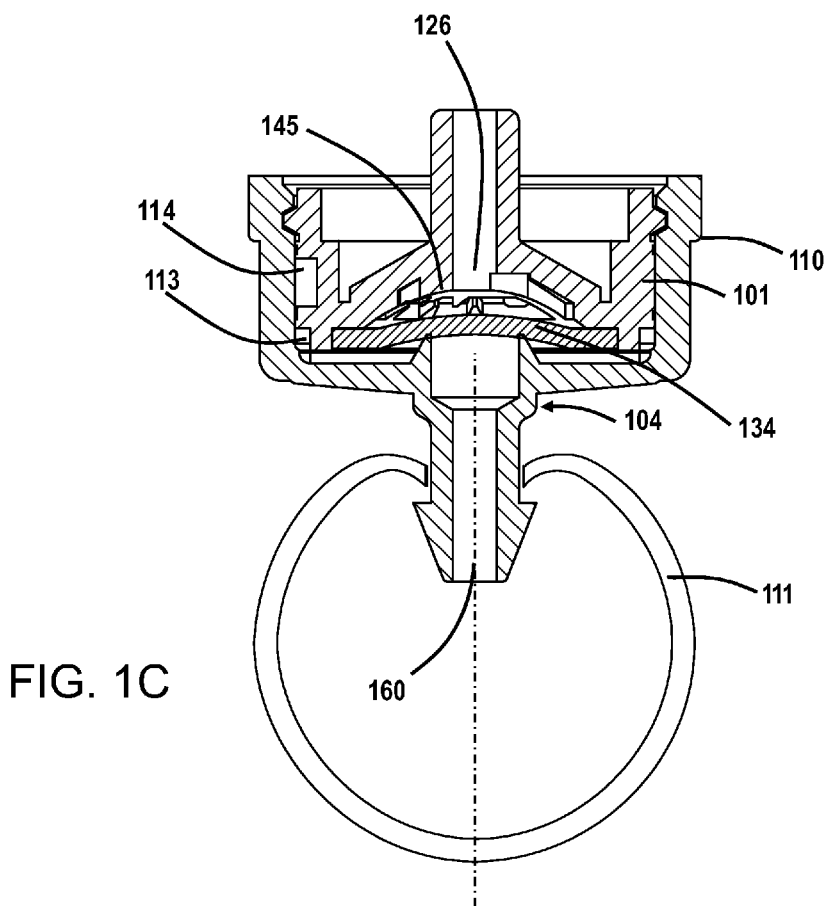
FIG. 1A  FIG. 1B
FIG. 1C

FLOW REGULATOR FOR AGRICULTURAL DRIP EMITTER

RELATED APPLICATION

This application claims priority from GB Patent Application No. GB1017985.1, the contents of which are incorporated by reference as if fully set forth herein.

FIELD AND BACKGROUND OF THE INVENTION

The present invention, in some embodiments thereof, relates to a flow regulator and, more particularly, but not exclusively, to a regulator for flow to an agricultural emitter that preserves a desired discharge under varying fluid inlet pressures.

With population increase and climate changes, water resources are becoming scarcer, forcing farmers and gardeners to save water and direct irrigation to a close vicinity of target plants. Such a directional irrigation is achieved by drip emitters, fed by an irrigation pipe of relatively high water pressure. Flow restrictors in the emitter reduce the water pressure such that the water emits an output inlet as drops, slowly irrigating soil near the emitter and a target plant.

U.S. Pat. No. 5,279,462 to Mehoudar and U.S. Pat. No. 4,209,133 to Mehoudar teaches a drip level irrigation emitter unit flow restrictor. A resiliently flexible membrane sealingly separates inlet and outlet control chambers. The membrane is displaceable with respect to the flow restrictor, such that inlet and outlet chambers respectively communicate with an inlet and an outlet of the flow restrictor. This is necessary in order to ensure that the predetermined pressure differential between the chambers is not unduly influenced by the magnitude of the inflow pressure.

U.S. Pat. No. 6,250,571 to Cohen discloses a drip irrigation emitter of the regulating labyrinth type with baffles facing an elastic membrane, the baffles having a concave configuration and also having notches of increasing depth from one end of the labyrinth flow path to the opposite end. Such a construction permits a continuous and gradual decrease to be produced in cross-sectional areas of the bypasses defined by the notches in response to an increase in the inlet pressure.

U.S. Pat. No. 4,623,094 to Smeyers teaches a dripper in which a flexible membrane has a frusto-conical part with a smooth outer surface facing a matching wall with a sinuous groove in a thickened portion of the wall.

U.S. Pat. No. 5,615,838 to Eckstein discloses dripper in which a resilient membrane is mounted in the valve chamber for closing an emitter inlet when the fluid pressure in the pipe is below a minimum pressure and for opening the emitter inlet when the fluid pressure in the pipe is above the minimum pressure. The membrane further flexes toward a generally flat inner wall housing second, third and fourth outlets at pressures greater than the minimum pressure. The second, third and fourth outlets and associated valve chamber are structured so that the fluid flow through the outlets is varied over respective ranges of pressures to produce, for higher pressures, fluid flow through more of a labyrinth.

Additional background art includes my U.S. Pat. Nos. 5,400,973 and 5,609,303, as well as in Eckstein et al U.S. Pat. No. 5,615,838.

SUMMARY OF THE INVENTION

According to an aspect of some embodiments of the present invention there is provided a flow regulator for a drip irrigation emitter including a cylindrical cavity. The cylindrical cavity may have an inlet connectable to a pressurized source of a fluid and an outlet. A pathway may connect the inlet to the outlet. The flow regulator may also include a smooth concave dome surface. A deformable membrane may be biased to block backflow out the inlet. The deformable membrane may deform to approach a matching smooth concave dome shaped surface. A channel portion of the pathway from the inlet to the outlet may define a curve on the smooth concave dome shaped surface. A plurality of baffles may extend substantially transversely of and spaced along the channel portion of the pathway. The baffles may define a flow-restricting labyrinth imposing a resistance to flow of the fluid through the channel portion. One face of the baffles and the channel portion may be smoothly integrated into the smooth concave dome shaped surface. There may be an irregularity at an interface between the concave dome shaped surface and the deformable membrane. The irregularity may define a helical bypass passageway. The helical bypass passageway may be substantially parallel to the channel portion. The deformable membrane may be configured to deform and progressively block the helical bypass passageway in response to an increasing pressure differential between the inlet and the outlet. The progressive blocking of the bypass passageway may maintain a substantially constant discharge through the pathway under influence of the increasing pressure differential.

According to some embodiments of the invention, the irregularity may include a helical ridge, a key, a groove, a rib, a change in elasticity, multiple grooves, a bump, multiple bumps and/or multiple ridges.

According to an aspect of some embodiments of the present invention there is provided a flow regulator for a drip emitter including a concave dome shaped surface, and a deformable member. The deformable member may have a deform configuration to approach the matching concave dome shaped surface. The regulator may also include a channel defining a curved path along the concave dome shaped surface. The channel may have an edge continuous with the concave dome shaped surface.

According to some embodiments of the invention, the dome shaped surface may be smooth.

According to some embodiments of the invention, the regulator may further include an irregularity of an interface between the membrane and the concave dome shaped surface. The irregularity may define a bypass passageway.

According to some embodiments of the invention, the irregularity may be configured to maintain a substantially constant discharge across the flow regulator under variation of a pressure differential between the inlet and the outlet.

According to some embodiments of the invention, the deformable member may progressively block the bypass passageway as the pressure differential increases.

According to some embodiments of the invention, the irregularity may include a varying thickness obstacle interposed between the deformable member and the concave dome shaped surface.

According to some embodiments of the invention, the varying thickness obstacle may include a helical ridge, a key, a groove, a rib, a change in elasticity, multiple grooves, a bump, multiple bumps and/or multiple ridges.

According to some embodiments of the invention, the deformable member may deform in response to a pressure differential across the deformable member.

According to some embodiments of the invention, the channel includes a labyrinth.

According to some embodiments of the invention, the deformable member includes a membrane.

According to some embodiments of the invention, the deformable member may be biased to close a fluid inlet.

According to some embodiments of the invention, the regulator may further include a filter element coupled to move with the deformable member.

According to some embodiments of the invention, the filter element may include a ram.

According to some embodiments of the invention, the filter element may be configured for cleaning a fluid inlet.

According to some embodiments of the invention, the filter element may be configured for ejecting a particle from a fluid inlet.

According to an aspect of some embodiments of the present invention there is provided a method for regulating fluid flow including deforming a membrane to approach a matching dome shaped surface, and forcing flow to pass through a high resistance channel. The high resistance channel may define a curved path on the dome shaped surface. The deforming may block a passageway bypassing the high resistance channel.

According to some embodiments of the invention, the deforming may result from a pressure differential and the blocking may increase progressively with increasing of the pressure differential.

According to some embodiments of the invention, the method may further include moving a filter element by the deforming of the membrane.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1a is a bottom perspective view of a regulator;

FIG. 1b is a top perspective view of a regulator;

FIG. 1c is longitudinal cutaway view of a regulator integrated into a drip emitter;

FIG. 4a' is a close up view of a filtering tip cleaner ram in a retracted pose, and FIG. 4a" is a close up view of a filtering tip cleaner ram in an extended pose.

DESCRIPTION OF SPECIFIC EMBODIMENTS OF THE INVENTION

Figure 2:
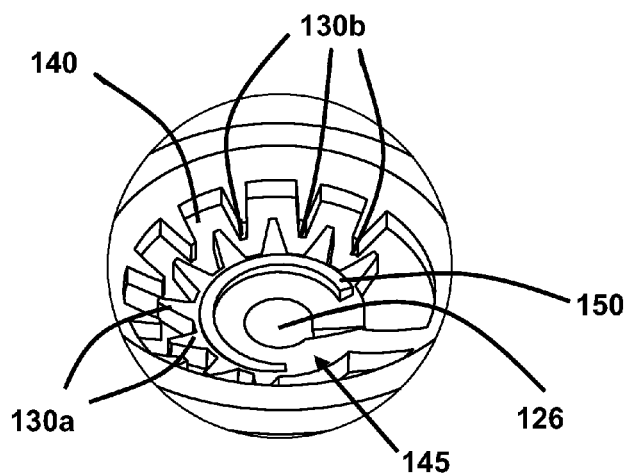
FIG. 2 a possible embodiment of a regulator with irregularities on a concave surface.

The present invention, in some embodiments thereof, relates to a flow regulator and, more particularly, but not exclusively, to a regulator for flow to an agricultural emitter that preserves a desired discharge under varying fluid inlet pressures.

It is sometimes desirable that flow restrictors emit a constant predictable flow rate under varying conditions. For example sometimes topography or pressure loss over extensive piping causes differences in input pressure in different areas of a field. The desired water flow to plants may not be dependent on these factors and therefore it may be desirable to have a flow regulator that is not sensitive to changes in inlet pressure.

Resistance of a flow regulator for an agricultural emitter may be controlled by interaction between a deformable member and a matching shaped surface. The surface may be concave to match a bulging deformed shape of the deformable member. Deformation may cause the deformable member to approach the concave surface. A flow resistant channel may define a curved path on the surface. As the deformable member deforms, it may progressively cut off a bypass passageway and force flow through the flow resistant channel thereby increasing the flow resistance of the regulator and decreasing discharge. The dome shape of the surface may match the natural (bulging) shaped of a deformed membrane. This may lead to precise control of bypass flow because the approach of the membrane to the surface without irregularities is relatively uniform and can be easily predicted. Therefore any irregularities have a distinct and predictable and easily controlled effect.

The geometry of the flow resistant channel or irregularities at the interface between the surface and the deformable member may be adjusted to tune the discharge of the emitter. For example, the emitter may be designed to achieve fixed output over a large range of inlet pressures (preferentially the fixed discharge may be for example between 0.5 and 8.0 l/hr and the input pressure may be for example between 0.5-3.0 bar), or the emitter may be designed to make discharge a linear function of pressure, or the flow channel may have discrete components which cause a first fixed flow rate in a first pressure range and a second fixed rate in a second pressure range.

In some embodiments, the membrane may approach the dome shaped surface non-uniformly. For example, the membrane or surface may have non-uniformities or irregularities or the membrane may be supported at non-uniform distance from the surface.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1b illustrates a top perspective view of a possible example of a self adjusting flow restrictor 101 (top according to the orientation of FIG. 1c), and FIG. 1a illustrates restrictor 101 flipped over (a bottom view according to the orientation of FIG. 1c). A resistant flow regulating channel 140 defines a curved path on a smooth concave dome shaped surface 145. The curvature of surface 145 is seen more clearly in FIGS. 2 and 3. In the embodiment of FIGS. 1*a-c* the diameter of the dome is for example between 0.5 and 2.0 cm while the inner height (from the base to the apex) is for example between 2-5 mm. Preferentially, the dome shape surface is smooth, but in alternative embodiments it may be formed of jointed elements.

A possible embodiment of a deformable member (a flexible membrane 134) is shown in an unstressed state in FIG. 1*c*. In the unstressed state, a space exists between membrane 134 and surface 145. The empty space serves as a low resistance bypass passageway allowing free fluid flow across the regulator (from inlet 160 toward outlet 126.

When high pressure fluid is introduced to inlet 160, membrane 134 is stressed, by a pressure differential across membrane 134. The pressure differential is between the inlet side of membrane 134 and the outlet side of membrane 134. Under the stress, membrane 134 deforms, bulging to approach matching surface 145. As membrane 134 approaches and eventually engages part or all of surface 145, membrane 134 closes off, partially or fully, the bypass passageway. Closing the bypass passageway forces flow across the regulator to traverse part or all of highly resistant channel 140. As deformation increases, bypass flow is reduced and the resistance of the regulator is increased.

FIG. 1*c* is a longitudinal cross sectional view of a possible embodiment of an irrigation emitter incorporating restrictor 101. A cylindrical conduit 104 has an inlet 160 connectable to a pressurized source of a fluid (pipe 111). A flow pathway connects said inlet to an outlet 126. The flow pathway leads from the conduit 104 to a pressure reducing labyrinth 114 and then to flow regulating labyrinth (channel 140) and then out outlet 126, as described herein below. Pressure reducing labyrinth 114 serves to control the relationship between pressure differential across membrane 134 and the pressure difference between inlet 160 and outlet 126. Alternative methods to control this relationship are possible, for example a narrow conduit.

In FIG. 1*c*, flexible membrane 134 is shown in a closed state. In the closed state, membrane 134 is biased toward inlet 160 and acts as a one way valve, prevent backflow out inlet 160. Alternatively, the biasing may be adjusted so that membrane closes inlet 160 only when backflow pressure (pressure on the outlet side of membrane 134 that is greater than pressure on the inlet side) is greater than a threshold. Alternatively, membrane 134 may be biased to lie against surface 145 in the closed state.

In operation, pressurized fluid enters inlet 160 and applies a stress on membrane 134 toward outlet 126. The stress overcomes the bias of the membrane and deforms membrane 134, causing membrane 134 to bulge towards outlet 126. This bulging causes membrane to separate from conduit 104, allowing flow out from conduit 104 into restrictor 101.

In the embodiment of FIG. 1*a-c* flow travels outward through an optional duct 113 to pressure reducing labyrinth 114 which circles around flow restrictor 101 along the inside of a cylindrical outer wall 110 of the emitter. Pressure reducing labyrinth 114 controls the pressure on the outlet side of membrane 134. Then flow travels inward through a second optional duct 115.

At low inlet pressure, flow from duct 115 bypasses regulating channel 140. The bypass flow passes between membrane 134 and surface 145 directly from duct 115 to outlet 126.

When inlet pressure is high, the pressure causes membrane 134 to deform, bulging into a convex shape. As the inlet pressure increases membrane 134 approaches and engages surface 145. As membrane 134 approaches and engages surface 145 the bypass flow is progressively reduced and eventually cut off. Reducing bypass flow forces flow going to outlet 126 from duct 115 to pass through high resistance channel 140 increasing the resistance across the regulator.

In the example of FIG. 1*a*, channel 140 defines a substantially circular path curving about 330 degrees around the periphery of surface 145. Alternatively channel 140 may have a non-circular shape, for example, spiral shape (spiraling inward from the edges). Teeth like baffles 130*a* and 130*b* impose a resistance to flow through channel 140. Except for irregularities described below, the edges of channel 140 and the bottom face of baffles 130*a,b* are smoothly integrated into surface 145 (as can be seen in FIG. 2).

Preferably, there are an external series of baffles 130*b* and an internal series of baffles 130*a*. The two series oppositely project into channel 140. The end of each internal baffle 130*b* is interposed between two baffles 130*a* of the outer series. Baffles 130*a* are broader than baffles 130*b*. The geometry of baffles 130*a,b* creates a labyrinth flow path through channel 140. Therefore, flow through channel 140 is turbulent and torturous. Other geometries of baffles are possible; the baffles could be symmetrical on both sides, there could be baffles only on one side of the channel, baffles could have a three dimensional aspect (some baffles above, others below).

Preferentially, as illustrated in FIG. 1*c*, the body of the emitter includes a cylindrical cavity that joins inlet 160 to outlet 126.

Figure 3:
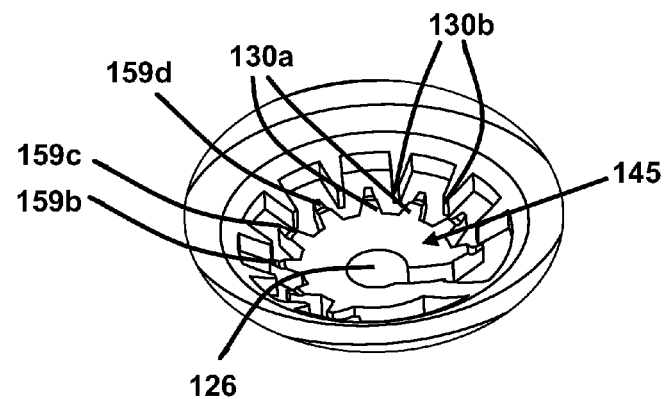
FIG. 3 is an alternative possible embodiment a regulator with irregularities on a concave surface.

Also seen in FIGS. 1*a*, 2, and 3 are two possible embodiments of irregularities in the interface between surface 145 and membrane 134. The irregularities impede blockage of the bypass channel. In some embodiments, the irregularities may keep the bypass passageway open by impeding contact between membrane 134 and surface 145 (for example when the irregularities are interposed between membrane 134 and surface 145 [as illustrated in FIG. 2]). In other embodiments, the irregularities may provide a secondary bypass channel that remains open when membrane 134 engages the underlying curved surface 145 (for example the irregularity may be a secondary bypass passageway etched out below surface 145 [as illustrated in FIG. 3]).

For example in the embodiment of FIG. 2 the irregularity is a helical ridge 150 of increasing height in the clockwise direction. As membrane 134 approaches surface 145 contact is obstructed in the vicinity of ridge 150. The space around ridge 150 forms a helical bypass passageway substantially parallel to channel 140. As inlet pressure increases membrane 134 deforms around higher and higher portions of ridge 150 progressively shortening and narrowing the bypass passageway. This causes progressive increase of resistance with increasing pressure. Adjusting the shape of the irregularity adjusts the discharge through restrictor 101. In the example of FIG. 2 adjustment of the resistance keeps the discharge constant over a wide range of pressure differentials between inlet 160 and outlet 126.

An alternate embodiment of an irregularity (grooves 159*a-d*) is illustrated in FIGS. 1*a* and 3. The irregularity of FIG. 3 is a progressively deepening groove (groove 159*d* is deeper than groove 159*c* which is deeper than groove 159*b*). As inlet pressure increases, membrane 134 progressively fills deeper and deeper grooves (159*b-d*) thereby progressively increasing resistance to flow and preserving a constant discharge. Alternatively, there may be progressively deeper keys, and/or the face of each of baffles 130*a,b* may be set back from the smoothly domed concave surface. Alternatively, the irregularity could include a groove and/or a ridge and/or local change of elasticity in the deformable membrane, and/or a bump, and/or multiple bumps. A ridge shaped irregularity need not be helical. In some embodiments, an irregularity may include a ridge having a shape that is rectangular, piecewise linear, or curved.

In alternative embodiments, the geometry of the irregularity may be configured to achieve various different relationships between discharge and inlet pressure. In one possible embodiment an irregularity may cause a very sharp increase in resistance with increasing pressure at the inlet. For example a groove or a ridge could have a very shallow slope such that a small change in pressure causes a large change in the length of the bypass passageway. Such an irregularity would cause the discharge to decrease with increasing inlet pressure (over a certain pressure range). Alternatively there may be two discrete irregularities with different properties (for example one deep groove and one shallow groove). Such an embodiment would preserve a first discharge over one range of pressures and preserve a different discharge over a second range.

A concave dome shaped surface need not be circular. For example a dome could have oval boundary or have another shape. In cases of non-circular surfaces, the deformable element would also be adjusted accordingly. For example, if the boundary of the concave domed shaped surface were oval, the membrane may be fixed to the edges of an oval mounting aperture (and thus bulge into an oval shape). The thickness of the membrane may be non-uniform (for example it may have a longitudinal groove or a transverse rib) thereby causing non-uniform bulging.

The path of resistant channel 140 may not be circular and may not follow the periphery of the concave surface. For example the channel may be spiral or may wind around the surface in an arbitrary fashion.

Figure 4A:
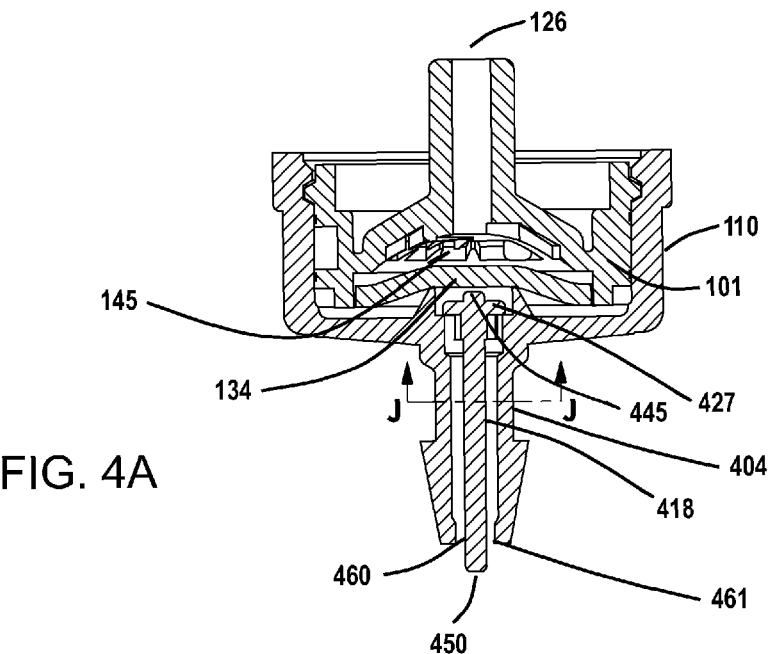
FIG. 4a is a cutaway longitudinal view of an emitter with a ram for cleaning a filtering tip.
Figure 4A:
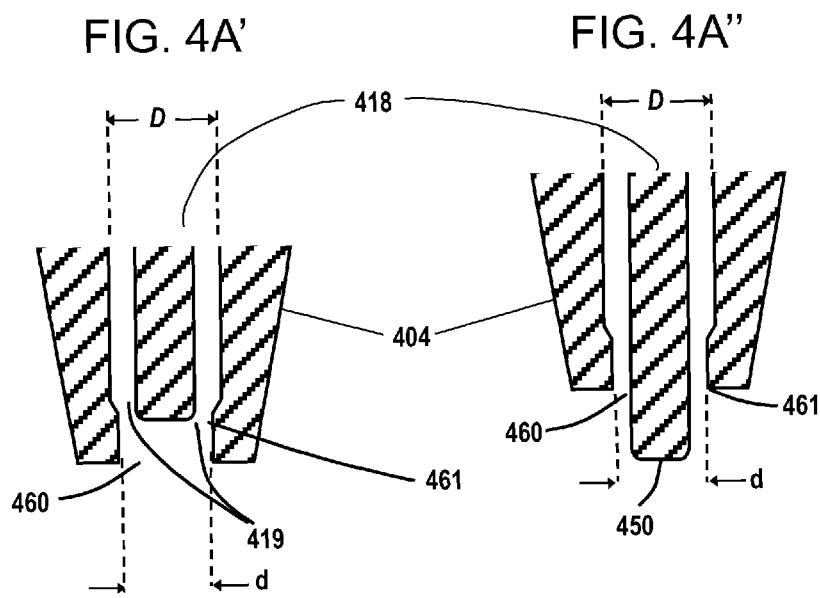

FIG. 4a illustrates a possible embodiment of a self moving ram 418 filter cleaner integrated with flexible membrane 134 of a flow restrictor 101. When deformable member 134 deforms, it moves a filter element, ram 418. According to the posture of membrane 134, the filtering element is moved between various postures, possibly including an open posture, a cleaning posture and a closed posture.

In the example of FIG. 4a, when membrane 134 is in a deformed posture, ram 418 may retract into a fluid inlet 460. When inlet pressure is reduced, membrane 134 returns to its biased posture and exerts a force on ram 418. The force on ram 418 extends a tip 450 of ram 418 out of fluid inlet 460. As tip 450 exits fluid inlet 460 it breaks up and/or pushes trapped solids out of fluid inlet 460; thereby cleaning fluid inlet 460. Alternatively, deformation of membrane 134 may move a different filter element to different postures.

FIG. 4a illustrates a possible embodiment of membrane 134 in its unstressed state. In an exemplary embodiment of the invention, in its unstressed state, flexible membrane 134 is biased towards fluid inlet 460. Consequently, in the unstressed state, membrane 134 pushes a ram 418 toward fluid inlet 460. As a result, in the unstressed state, a tip 450 of ram 418 extends out of fluid inlet 460 (as illustrated in FIG. 4a").

During operation of the emitter, fluid pressure at inlet 460 of conduit 404 is greater than fluid pressure at emitter outlet 126. As the pressure at inlet 460 rises, it causes membrane 134 to flex toward flow restrictor 101. The fluid pressure also pushes a shoulder 427 of self moving ram 418 towards flexible membrane 134. As a result, the entire rigid assembly (shoulder 427 and self moving ram 418) moves longitudinally up conduit 404 and ram tip 450 is retracted into conduit 404 (as shown in FIG. 4a'). While ram tip 450 is in the retracted pose, fluid can flow through a narrow channel 419.

Upon reduction of water pressure at inlet 460, membrane 134 returns to its biased posture and pushes against ram 418. As a result, ram 418 slides down conduit 404 extending ram tip 450 out inlet 460. As ram tip 450 passes through inlet 460 it may unclog the filter. The ram may grind and break away solids trapped in narrow channel 419 and/or eject some solids out fluid inlet 460 into the fluid source (for example pipe 111). As membrane 134 snaps back, it produces a small amount of backflow which washes particles out the emitter.

Ram 418 has a head 445 nearby membrane 134. The internal diameter of conduit 404 decreases for example from a diameter D between 2.5-4.0 mm to a constriction 461 of diameter d between 2.0-3.5 mm at inlet 460.

Figure 5:
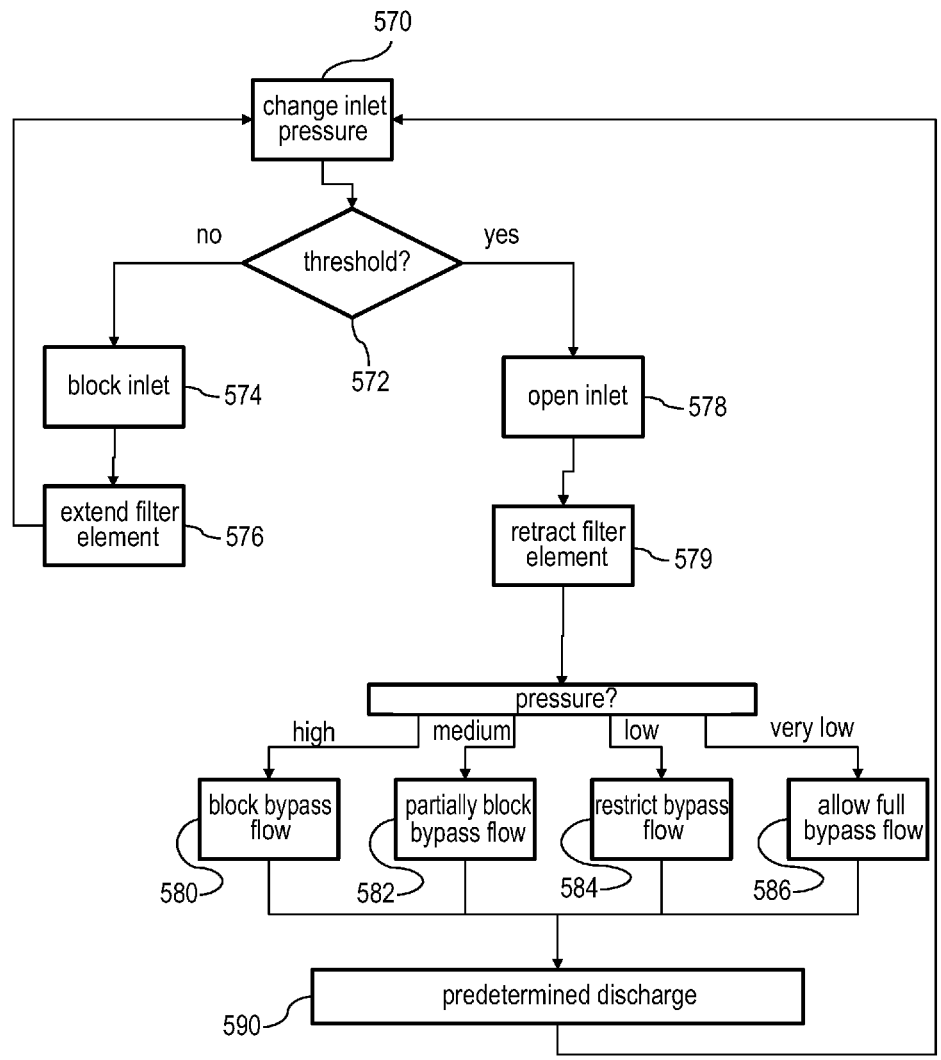
FIG. 5 is a flowchart illustrating an exemplary embodiment of a method of maintaining a predetermined fluid discharge over a range of inlet pressures.

FIG. 5 is a flowchart illustrating an exemplary embodiment of a method for supplying predetermined flow rate to one or many plants. For example when connected to an irrigation tube, the emitters may supply a fixed discharge rate independent of the geometry of the field (the length of the tube, the rise and fall of the landscape).

For example we consider a first plant needing four liters of water per day and a second needing two liters and emitters designed to produces a flow rate of two l/hr under 0.5-3.0 bar inlet pressure. Two emitters are installed near the first plant and a single emitter is installed near the second plant. To supply the proper irrigation volume to both plants, water is turned on for one hour per day.

The pressure at inlet 460 changes 570 when the water is turned on or off. If the inlet pressure is less than a critical threshold 572, then membrane 134 returns to its biased position. When membrane 134 returns to its biased position, it pushes the top of ram 418 toward fluid inlet 460. This extends 576 tip 450 of ram 418 out inlet 460, it also pushes particles and deposited solids out inlet 460. In the extended pose, shoulder 427 blocks 574 conduit 404 to prevent backflow (flow of soil water or gas into outlet 126 through the emitter and back out inlet 460).

When the inlet pressure is greater than the critical threshold 572, then the pressure pushes ram 418 and membrane 134 away from inlet 460. Ram 418 retracts 579 up inlet conduit opening 578 the flow pathway between inlet 460 and outlet 126. Fluid flows into pressure reducing labyrinth 114. The fluid exits pressure reducing labyrinth 114 at reduced pressure. The low pressure fluid passes duct 115 to the outlet side of membrane 134. The pressure differential across membrane 134 (between the high pressure fluid on the inlet side and the low pressure fluid on the outlet side) causes membrane 134 to deform and bulge toward concave surface 145.

When the inlet pressure is very low 586, then membrane 134 only deforms slightly. A space remains between membrane 134 and surface 145. The space serves as a low resistance passageway for fluid flow from duct 115 to outlet 126. Fluid flows through this passageway to outlet 126, bypassing high resistance channel 140. Thus, at low inlet pressures the resistance to flow through the emitter is small and the predetermined discharge is maintained 590.

As the pressure increases at inlet 160, the pressure differential across membrane 134 increases. When inlet pressure is low 584, but not very low 586, then membrane 134 deforms enough to restrict the space between membrane 134 and surface 145. The restricted space produces a small resistance to fluid flow. Thus, there is a slightly increased resistance to flow from duct 115 to outlet 126. This, slight extra resistance to flow through the emitter maintains 590 the same predetermined discharge as above in the case of very low 586 inlet pressure.

At medium 582 inlet pressure membrane 134 deforms to approach the matching concave shaped surface 145. Membrane 134 engages surface 145 blocking bypass flow except where there are irregularities in the interface. For example helical ridge 150 intercedes between membrane 134 and surface 145. A narrow bypass passageway is formed at the base of ridge 150. Fluid flows along this passageway from duct 115 to outlet 126. The resistance along this passageway maintains 590 the predetermined discharge at the medium 582 inlet pressure.

As inlet pressure rises membrane 134 is forced to bend around ridge 150 blocking progressively larger sections of the bypass passageway. Where the bypass passageway is blocked, flow from duct 115 is forced to pass through high resistance channel 140. Thus as pressure progressively increases, the resistance to flow also progressively increases and the predetermined discharge is maintained 590. Eventually at high 580 inlet pressure, the bypass passageway is entirely blocked and substantially all flow passes through substantially all of high resistance channel 140.

By adjusting the slope of ridge 150 different predetermined discharge patterns are achieved. A smaller sloped ridge may achieve a reduction of discharge as inlet pressure increases. A more highly sloped ridge may allow some increase of flow as pressure increases.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", an and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A regulator for a drip irrigation emitter comprising:
    a) a cylindrical cavity having an inlet connectable to a pressurized source of a fluid and an outlet, and wherein a pathway connects said inlet to said outlet;
    b) a deformable membrane biased to block backflow out said inlet in an unstressed configuration; said deformable membrane also having a deformed configuration
    c) a smooth concave dome shaped surface having a shape matching said deformed configuration, and wherein said deformable membrane deforms to approach said smooth concave dome shaped surface;
    d) a channel portion of said pathway, said channel portion defining a curve on said smooth concave dome shaped surface;
    e) a plurality of baffles extending substantially transversely of and spaced along said channel portion; said plurality of baffles defining a flow-restricting labyrinth imposing a resistance to flow of said fluid through said channel portion, one face of said plurality of baffles and said channel portion smoothly integrated into said smooth concave dome shaped surface, and
    f) an irregularity in an interface between said concave dome shaped surface and said deformable membrane, said irregularity defining a helical bypass passageway, said helical bypass passageway being substantially parallel to said channel portion,
    and wherein said deformable membrane is configured to deform and progressively block said helical bypass passageway in response to an increasing pressure differential between said inlet and said outlet thereby preserving substantially constant discharge through said pathway under influence of said increasing pressure differential.

2. The regulator of claim 1, wherein said irregularity includes at least one geometry selected from the group consisting of a helical ridge, a key, a groove, a rib, a change in elasticity, multiple grooves, a bump, multiple bumps and multiple ridges.

3. A regulator for a drip emitter comprising:
    a) a deformable member;
    b) a concave dome shaped surface matching a deformed configuration of said deformable member;
    c) a channel defining a curved path along said concave dome shaped surface, said channel having an edge continuous with said concave dome shaped surface, and d) an irregularity of an interface between said deformable member and said concave dome shaped surface defining a bypass passageway.

4. The regulator of claim 3, wherein said irregularity is configured to maintain a substantially constant discharge across the regulator under variation of a pressure differential between an inlet and an outlet thereof.

5. The regulator of claim 4, wherein, said deformable member progressively blocks said bypass passageway as said pressure differential increases.

6. The regulator of claim 3, wherein said irregularity includes a varying thickness obstacle interposed between said deformable member and said concave dome shaped surface.

7. The regulator of claim 6, wherein said varying thickness obstacle includes at least one geometry selected from the group consisting of a helical ridge, a key, a groove, a rib, a change in elasticity, multiple grooves, a bump, multiple bumps and multiple ridges.

8. The regulator of claim 3, wherein said deformable member deforms in response to a pressure differential across said deformable member.

9. The regulator of claim 3, wherein said channel includes a labyrinth.

10. The regulator of claim 3, wherein said deformable member includes a membrane.

11. The regulator of claim 10, wherein said deformable member is biased to close a fluid inlet.

12. The regulator of claim 3, further comprising:
   d) a filter element coupled to move with said deformable member.

13. The regulator of claim 12, wherein said filter element includes a ram.

14. The regulator of claim 12, wherein said filter element is configured for cleaning a fluid inlet.

15. The regulator of claim 13, wherein said ram is configured for ejecting a particle from a fluid inlet.

* * * * *